(12) United States Patent
Herbst

(10) Patent No.: US 6,827,571 B2
(45) Date of Patent: Dec. 7, 2004

(54) APPARATUS FOR INJECTION-MOLDING PLASTIC MATERIAL ARTICLES CONSISTING OF A PLURALITY OF COMPONENTS

(75) Inventor: Richard Herbst, Kranzberg (DE)

(73) Assignee: Richard Herbst GmbH, Kranzberg (DE)

( * ) Notice: Subject to any disclaimer, the term of this patent is extended or adjusted under 35 U.S.C. 154(b) by 338 days.

(21) Appl. No.: 09/904,937

(22) Filed: Jul. 12, 2001

(65) Prior Publication Data

US 2002/0079619 A1 Jun. 27, 2002

(30) Foreign Application Priority Data

Jul. 12, 2000 (DE) .......................................... 100 33 759

(51) Int. Cl.⁷ .......................... B29C 45/40; B29C 45/42
(52) U.S. Cl. ...................... 425/556; 264/254; 264/255; 264/334; 425/572; 425/576
(58) Field of Search ................................ 425/144, 145, 425/556, 572, 574, 575, 576; 264/254, 255, 334

(56) References Cited

U.S. PATENT DOCUMENTS

| | | | |
|---|---|---|---|
| 5,772,049 A | | 6/1998 | Randone |
| 6,042,364 A | * | 3/2000 | Nishida ...................... 425/574 |
| 6,071,454 A | * | 6/2000 | Shimizu et al. ............. 204/255 |
| 6,086,808 A | | 7/2000 | Sorensen et al. |
| 6,280,665 B1 | * | 8/2001 | Kotzab ....................... 425/144 |
| 6,398,537 B2 | * | 6/2002 | Matysek ..................... 425/556 |
| 6,463,999 B1 | * | 10/2002 | Jung .......................... 425/144 |

FOREIGN PATENT DOCUMENTS

| | | |
|---|---|---|
| DE | 197 49 245 C4 | 7/1997 |
| EP | 0903213 A2 | 3/1999 |
| JP | 9052261 | 2/1997 |

* cited by examiner

Primary Examiner—Tim Heitbrink
(74) Attorney, Agent, or Firm—Knobbe, Martens, Olson & Bear, LLP

(57) ABSTRACT

A method and an apparatus for injection-molding plastic material articles, in particular articles consisting of a plurality of components, are disclosed. An injection molding machine has a mold, e.g. a stack mold. The mold is adapted to be temperature-controlled differently in different areas of the mold. A center platen of the stack mold on a first side thereof cooperates with a first mold portion via a first separation plane and, on a second side thereof cooperates with a second mold portion via a second separation plane. The stack mold is provided with a plurality of first, smaller cavities as well as with a plurality of second, larger cavities. A device are provided for injection-molding the first components of the plastic material article in first cavities located in the first separation plane and injection-molding the second components on the first components within the second cavities. A handling system unmolds the first components from the first cavities, transfers same from the first to the second separation plane, places same into the second cavities, and unmolds the plastic material articles from the second cavities. The handling system is provided with e.g. two arms adapted to be inserted into the first and into the second separation plane, respectively, independently one from the other.

18 Claims, 12 Drawing Sheets

APPARATUS FOR INJECTION-MOLDING PLASTIC MATERIAL ARTICLES CONSISTING OF A PLURALITY OF COMPONENTS

FIELD OF THE INVENTION

The present invention is related to the field of plastic material injection-molding.

Still more specifically, the invention is related to a method of injection-molding plastic material articles consisting of a plurality of components, comprising the steps of:

a) providing an injection molding machine having a stack mold in which a center platen on a first side thereof cooperates with a first mold portion via a first separation plane and, on a second side thereof cooperates with a second mold portion via a second separation plane, the stack mold being provided with a plurality of first, smaller cavities as well as with a plurality of second, larger cavities;

b) injection-molding of the first components of the plastic material article in first cavities located in the first separation plane;

c) unmolding the first components from the first cavities;

d) transferring the first components from the first separation plane to the second separation plane;

e) placing the first components into the second cavities;

f) injection-molding the second components on the first components within the second cavities; and g) unmolding the plastic material articles from the second cavities.

The invention, further, is related to an apparatus for injection-molding plastic material articles consisting of a plurality of components comprising:

a) an injection molding machine having a stack mold in which a center platen on a first side thereof cooperates with a first mold portion via a first separation plane and, on a second side thereof cooperates with a second mold portion via a second separation plane, the stack mold being provided with a plurality of first, smaller cavities as well as with a plurality of second, larger cavities;

b) means for injection-molding
of the first components of the plastic material article in first cavities located in the first separation plane;
of the second components on the first components within the second cavities;

c) a handling system for
unmolding the first components from the first cavities;
transferring the first components from the first separation plane to the second separation plane;
placing the first components into the second cavities, and
unmolding the plastic material articles from the second cavities.

BACKGROUND OF THE INVENTION

A method and an apparatus of the type specified before is disclosed in German patent specification 197 49 245 C2.

The invention, moreover, is related to a method for injection-molding plastic material articles in an injection molding machine having a mold in which at least one first mold portion cooperates with at least one second mold portion via at least one separation plane.

Finally, the invention is related to an apparatus for injection-molding plastic material articles in an injection molding machine comprising a mold in which at least one first mold portion cooperates with at least one second mold portion via at least one separation plane.

A method and an apparatus of the last-mentioned kind are generally known in the art.

Within the technology of plastic material injection-molding, it is well known to manufacture plastic material articles from a plurality of components. These various components may, e.g., consist of different plastic materials in order to take care of different requirements within different surface areas of the manufactured plastic material article. However, the various components may also consist of the same plastic material, however, being of a different color. By doing so, it is possible to manufacture multi-colored plastic material articles.

Various methods and apparatuses have been utilized for manufacturing such multi-component plastic material articles. It is, for example, well known to provide different hollow cavities or two groups of differently shaped hollow cavities, respectively, within one injection mold. In a first step, a first component of plastic material article is manufactured within the small hollow cavities by injection-molding. One may now transfer this component into the larger hollow cavity or, by appropriately displacing the mold one may configurate another hollow cavity above the component just manufactured. In any event, the second component of the plastic material article is directly injection-molded onto the first component in a further method step so that the two components are intimately adhered to one another.

It should be mentioned at this instance that the invention is not at all limited to the field of manufacturing multi-component plastic material articles. Instead, the invention may also be advantageously used for general applications, as long as areas of different temperature within the mold are concerned. The same applies for the use of stack molds which is also to be understood only as an example within the context of the present invention.

Published European patent application EP 0 903 213 A2 discloses various apparatuses and methods for manufacturing such plastic material articles. However, a technology is utilized in which an arm of a handling system or robot transversely enters into a gap between two mold portions of an injection mold when the latter is in its open operational position. After having entered between the mold portions, appropriate gripping elements transfer the components within the mold and unmold finished plastic material articles from the mold, respectively. In one of the shown and described embodiments (FIGS. 14A through 14L), a stack mold is utilized for that purpose. The term "stack mold" is to be understood to mean an injection-molding tool consisting of at least three portions, the center portion of which being identified as "center platen" within the art. The other two mold portions are located on opposite sides of the center platen. A stack mold, therefore, has at least two separation planes, namely on both opposite sides of the center platen in the transitory region to the two adjacent mold portions.

In the prior art apparatus, there is both a smaller and a larger hollow cavity within each separation plane. The two smaller hollow cavities are used for manufacturing the first component of the plastic material article as already mentioned above. The first components, when having been manufactured, are subsequently transferred to the larger hollow cavities and replete same by about one half. The second component is then directly injection-molded onto the first component within the larger hollow cavity.

The already mentioned robot arm is utilized for transferring the components and for unmolding the finished plastic material articles, respectively. The robot arm is adapted to be displaced in a transversal direction in the one or in the other separation plane and, moreover, may be displaced in a direction parallel to the opening or closing direction, respectively, of the mold so that it may be brought into positions where it is flush with the one or with the other separation plane, respectively.

During the transfer of the first component from the smaller hollow cavity to the larger hollow cavity, a change in separation plane is made in this prior art apparatus. Therefore, a first component having been manufactured within the first separation plane is then transferred into the larger hollow cavity in the other separation plane. For executing these transfers, the robot has a holding assembly on its free end. On both sides of the holding assembly, there are two grippers each for gripping components or work pieces, respectively, the grippers being configured, for example, as suction heads. The grippers on each of the sides have a distance one from the other that is equal to the distance between the smaller and the larger hollow cavity within the two separation planes of the mold. The holding assembly may be pivoted by 180° about an axis lying in the center between the two grippers and extending parallel to the direction of opening and closing of the mold. This prior art apparatus together with its associated method has two substantial disadvantages:

The first disadvantage consists in that each separation plane is provided with a large as well as with a small hollow cavity. This requires a complicated temperature control in the area of the two separation planes. As is well known in the art, one has to cool or to temperature-control injection molds during their operation in order to obtain optimum results. The requirements on such temperature control vary substantially depending on the size of the hollow cavity because the amount of heat brought into the hollow cavity highly depends on whether a larger or a smaller mass of liquid, i.e. very hot plastic material, is injected into various volumes of cavities.

A second disadvantage lies in the fact that a substantial amount of control is required due to the complicated reciprocal movements of the robot between the two separation planes which also implies relatively long transfer times However, in modern plastic material injection molding machines, this is highly undesired because the productivity of a plastic material injection molding machine highly depends on the cycle time. In the prior art apparatus and method discussed before, the cycle time to a high extent is determined by the displacement times of the handling systems, in particular of the robot arm when moved along the two necessary axes. Still worse, in the prior art apparatus, the stack mold is firstly opened only in the area of one separation plane for allowing the robot arm to enter into that separation plane, as the mold is still closed in the other separation plane. Only when the robot arm is about to enter into the second separation plane, the mold is also opened in the area of that second separation plane, however, it is then again closed in the area of the first separation plane. This requires a high amount of control in the area of the mold which is still more highly undesired because the mold may only be displaced relatively slowly due to its inherent inertia mass, in any event it is considerably slower as compared to the displaceable components of the handling system.

German patent specification 197 49 245 C1 mentioned at the outset discloses a method and an apparatus for injection-molding smart cards. Smart cards comprise a coil. For manufacturing the smart cards, a first card portion is injection-molded in a first hollow cavity. The coil is then applied to that first card portion. After having transferred the first card portion from the first hollow cavity to a second hollow cavity, a second card portion is injections-molded onto the first card portion, such that the coil is embedded between the two card portions. In a more general aspect, it is also disclosed in that specification that plastic material articles may be provided with items between two halves thereof or may be machined therebetween. Further (FIG. 23), a potential application is disclosed in which a stack mold is utilized for manufacturing these articles. In an open condition of the stack mold, a fork-type handling arm enters into the two gaps being open between the center platen on the one hand and the two lateral mold portions on the other hand, when the stack mold is in its open operational position. The handling arm unmolds the first part portions on the one side and transfers same to an external application station outside. the injection molding machine. When the coils have been applied to the first card portion, the first card portions are transferred to the other handling arm and, when the handling arm again enters into the mold, that handling arm enters into the second separation plane and places the card portions together with the coil into the larger hollow cavities which are located in that second separation plane.

It is, therefore, an object underlying the invention to provide a method and an apparatus of the type specified at the outset, such that the aforementioned disadvantages are avoided. In particular, the invention shall allow to simplify the design of the injection mold, to accelerate the process and, hence, to shorten the cycle time. Moreover, the reliability of the process and the quality of the plastic material articles so manufactured, shall be enhanced.

SUMMARY OF THE INVENTION

According to a first method of the type specified at the outset, this object is achieved in that the stack mold is temperature-controlled differently in the area of the first separation plane and in the area of the second separation plane.

According to a second method of the type specified at the outset, this object is achieved in that steps c), e) and g) are executed essentially independently one from the other.

According to a third method of the type specified at the outset, this object is achieved according to the invention in that the mold is temperature-controlled differently in different areas of the at least one separation plane.

According to a first apparatus of the type specified at the outset, the object underlying the invention is solved in that the stack mold in the area of the first separation plane and in the area of the second separation plane is provided with assemblies for different temperature-control.

In a second apparatus specified at the outset, the object underlying the invention is solved in that the handling system is provided with at least two arms adapted to be advanced into the first separation plane and into the second separation plane, respectively, essentially independently one from the other.

In a third apparatus of the type specified at the outset, the object underlying the invention is solved in that means are provided for temperature-controlling the mold differently in different areas of the at least one separation plane.

The object underlying the invention is thus entirely solved.

Namely, if, for example, all first hollow cavities are located within the first separation plane and all second hollow cavities are located in the second separation plane and a temperature control is effected of the type mentioned before, a highly simplified setting of the temperature within the mold is achieved. This is because one may optimize the temperature control for smaller hollow cavities alone within the one separation plane and for larger hollow cavities alone within the second separation plane. Accordingly, the masses within the mold become smaller and, hence, higher displacement speeds become possible, which, again, results in shorter cycle times.

If the various steps specified above are executed independently one from the other, in particular by utilizing a handling system having a plurality of arms adapted to enter into the mold simultaneously, the sequence of movements is simplified and likewise shortened so that, again, a contribution to the reduction of cycle time is made.

Seen as a whole, in the manufacture of plastic material articles consisting of a plurality of components in a stack mold, the invention yields substantial simplifications as compared to the prior art, both under apparatus aspects and under process aspects so that the cycle time may be substantially reduced.

The invention, further, has the advantage that due to the different temperature control and settings, the different sizes of hollow cavities within the separation planes may wholly be taken into account. This not only contributes to an increase in quality of the plastic material articles so manufactured. Further, in the area of a separation plane where a simpler temperature control assembly is sufficient, the design is simplified and the masses to be moved are reduced.

Finally, the invention has the advantage that when the arms are adapted to be moved independently from one another, individual processes may be executed, for example distinctly configurated arrangements of hollow cavities within the two separation planes may be approached individually.

According to a still further preferred improvement of the inventive method for injection-molding plastic material articles consisting of a plurality of components, a first component is firstly manufactured by injection-molding and then a second component is injection-molded on the first component, wherein the second component essentially encloses the first component.

This measure has, for example, the advantage that thick-walled articles may be injection-molded in a reliable manner, in that first a "nucleus" and then one or more shells or enclosures are injection-molded around the nucleus. when doing so, problems that would normally occur in connection with thick-walled articles do not occur, in particular with respect to the cooling down or the re-melting of surface areas.

In still another preferred improvement of this embodiment, the first component is essentially cylindrical and the second component surrounds the first component like a cylinder jacket or sleeve. As an alternative, one may also provide an article in which the second component goes through the first component, These measures have the advantage that complex, in particular thick-walled articles, may be manufactured which, for example, may consists of the same or of two or more different plastic materials and/or of plastic materials of different color.

According to a preferred embodiment of the invention, the handling system is provided with a robot having arms, the arms, when the stack mold is open, being adapted to be advanced in a direction essentially perpendicular to the opening direction into gaps between the center platen and the first and the second mold portion, the arms extending essentially in the direction of advancement.

These measures have the advantage that a substantial reduction in time with respect to the necessary transfer steps within the injection mold become possible because the mold may be opened simultaneously in the area of the two separation planes and the handling system may also enter simultaneously into the two separation planes for then executing the required transfers. It is, therefore, no more necessary to displace the handling system in a direction parallel to the opening direction of the mold.

In any event, it is preferred under the present invention when a first arm adapted to be advanced into the first separation plane on one side thereof is provided with seats for first components, and a second arm adapted to be advanced into the second separation plane on both sides thereof is provided with seats for plastic material articles.

These measures have the advantage that also with respect to the necessary seats or grippers or holders, the design is as simple as. possible because the afore-described configuration is sufficient to effect all required transfer steps and to unmold the finished plastic material articles from the injection mold.

In a preferred improvement of this embodiment, the second arm comprises two sub-arms, the seats of the second arm being located on opposite sides of the sub-arms.

This measure has the advantage that for the seats oriented along the two directions like components configured as the two sub-arms may be utilized which only need to be mounted in opposite directions on the one arm.

According to another embodiment of the apparatus, a transfer station is provided for transferring the first components from the seats of the first arm into seats of the second arm.

This measure has the advantage that the robot may be put to a standstill during that phase, i.e. it is not necessary to displace same in a direction parallel to the opening direction of the mold. Instead, one only needs a relatively small and, hence, quickly displaceable transfer station effecting the transfer of the component quickly and safely.

This holds true in particular when the transfer station is adapted to be displaced in a direction perpendicular to the sides of the arms, wherein it is further preferred when the transfer station is located adjacent the first arm, the first components being adapted to be transferred from the first arm directed to the transfer station.

A particularly good effect is achieved in that case if after the transfer of the first components the first arm is adapted to be displaced out of the trajectory of the transfer station, the transfer station being adapted to be displaced into a position adjacent the second arm.

This measure, too, has the advantage that due to a minimized sequence of movements, i.e. by moving only those elements that absolutely need to be displaced, an extremely fast process becomes possible.

In another embodiment of the invention, however, one may also provide that the robot is adapted to be rotated about an axis extending parallel to the advancement direction, such that after rotation the first arm is flush with the second separation plane and the second arm is flush with the first separation plane.

Depending on the design of the injection molding machine and of the handling system, this embodiment may be advantageous under dynamical aspects.

In connection with this embodiment it is preferred when the second arm is adapted to be rotated about an axis extending parallel to the advancement direction.

This measure has the advantage that a fast transfer also becomes possible in the area of the second arm.

In all embodiments of the invention, it is preferred when a conveyor is provided for carrying away the plastic material articles in the area of the second arm.

This measure has the advantage that the plastic material articles may be transferred to the conveyor at a location where they are unmolded from the tool, for carrying them away subsequently as quickly as possible.

Depending on the configuration of the robot, the plastic material articles may be transferred to the conveyor from the second arm on the side opposite the first arm or from the second arm on the side facing the first arm.

Further advantages will become apparent from the description and the enclosed drawing.

It goes without saying that the features mentioned before and those that will be explained hereinafter may not only be used in the particularly given combination, but also in other combinations or alone without leaving the scope of the present invention.

BRIEF DESCRIPTION OF THE DRAWINGS

Embodiments of the invention are shown in the drawing and will be discussed in further detail throughout the subsequent description.

DETAILED DESCRIPTION OF THE PREFERRED EMBODIMENTS

Figures 1A, 1B:
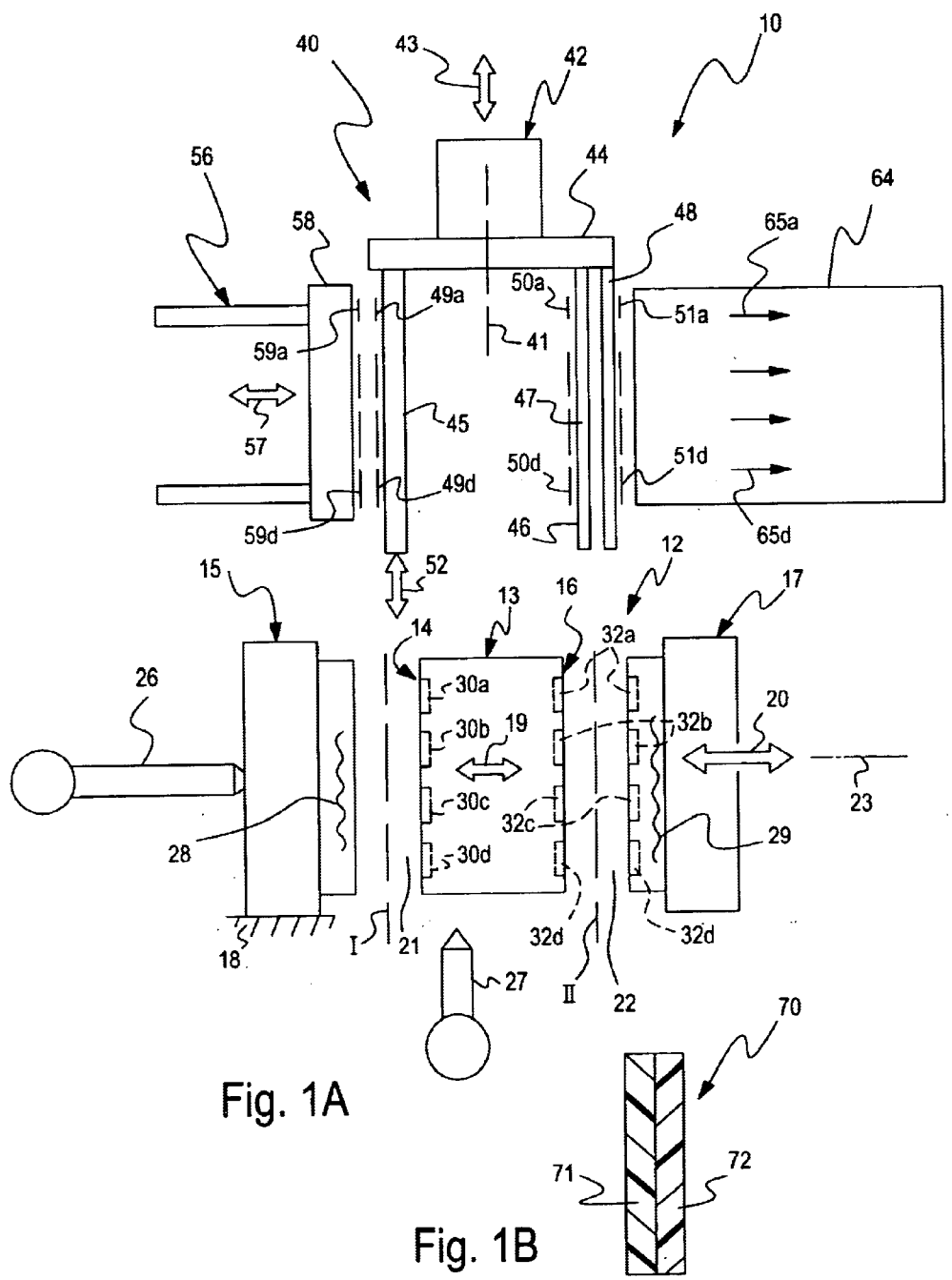
FIG. 1A shows a highly schematic top plan view on an embodiment of an inventive apparatus for injection-molding plastic material articles consisting of a plurality of components, with which the inventive method may be carried out.
FIG. 1B is a side-elevational, cross-sectional view on a plastic material article consisting of a plurality of components, on a highly enlarged scale.

In FIG. 1A, reference numeral 10 schematically indicates a plastic material injection molding machine adapted for manufacturing plastic material articles consisting of a plurality of components.

It should be emphasized at this occasion that the invention is not at all limited to the field of manufacturing multi-component plastic material articles. Instead, the invention may advantageously be utilized quite generally in the field of plastic material injection molding, unless the contrary is explicitly stated. The invention, further, is not limited with respect to certain plastic material injection molding machines or certain molds used therein, i.e. for example not limited to the use of stack molds unless something else is explicitly specified within the scope of the present invention.

Injection molding machine 10 comprises a stack mold 12 being shown in FIG. 1A in its open position. Stack mold 12 comprises a center platen 13, A first side 14 thereof, being the left hand side in FIG. 1A, adjoins a first mold portion 15. A second side 16 of center platen 13, being the right hand side in FIG. 1A, in contrast, adjoins a second mold portion 17. Therefore, a first separation plane I is defined between center platen 13 and first mold portion 15. Likewise, a second separation plane II is defined between center platen 13 and second mold portion 17.

As may further be seen from FIG. 1A, first mold portion 15 is connected to a base 18 and is, therefore, stationary. A shorter arrow 19 within center platen 13 and a longer arrow 20 within second mold portion 17 indicate that center platen 13 and second mold portion 17 are adapted to be displaced relative to stationary, first mold portion 15. Conventionally, second mold portion 17 is displaced with twice the velocity as compared to that of center platen 13 so that stack mold 12 opens up likewise in the area of first separation plane I and second separation plane II. The gaps so generated are indicated at 21 in the area of a first separation plane I and at 22 in the area of a second separation plane II. Reference numeral 23 designates a first axis coinciding with the direction of opening and closing, respectively, of stack mold 12.

A first injection molding assembly 26, i.e. a plastifying cylinder of conventional design together with its associated secondary elements, is connected to first mold portion 15. All this arrangement is conventionally stationary. A second injection molding assembly 27 is adapted to be connected to center platen 13, wherein the connection between second injection molding assembly 27 and center platen 13 must be renewed each time when stack mold 12 is closed again. Various kinds of plastic materials or like plastic materials of different color may be fed via injection molding assemblies 26 and 27.

Reference numeral 28 designates a first variable temperature assembly in the area of first mold portion 15, whereas reference numeral 29 designates a second variable temperature assembly within second mold portion 17.

Variable temperature assemblies 28 and 29 are used to set and control temperatures, i.e. to heat up and cool down stack mold 12 in the area of the cavities provided therein.

One should remember at this instance that variable temperature assemblies 28 and 29 should be understood to be only an example in connection with their use within stack mold 12. Similar variable temperature assemblies may of course be utilized in connection with other types of molds or stack molds, i.e. in connection with stack molds consisting of five or more mold portions. Moreover, the invention encompasses also the use of variable temperature assemblies under a very general aspect, e.g. also for molds consisting of only two mold portions.

In FIG. 1A, first hollow cavities are designated at 30a through 30d. First cavities 30A through 30d are located on first side 14 of center platen 13. First, mold portion 15 has a plane surface on the opposite side, i.e. is not provided with its own hollow cavities on that surface.

In contrast, second hollow cavities are designated at 32a through 32d. Second hollow cavities 32a through 32d are configured on second side 16 of center platen 13 together with the opposite surface of second mold portion 17. Second hollow cavities 32a through 32d are, for example, configurated by two equally large hollow cavity halves each, one of which being on second side 16 and on the opposite surface of second mold portion 17. The resulting large hollow cavities 32a through 32d within second separation plane II have the same cross-sectional area as first hollow cavities 30a through 30d within first separation plane I, however, they are deeper and their volume is, hence, larger.

It goes without saying that the afore-explained arrangement of hollow cavities 30a through 30d and 32a through 32d shall only be understood to be an example. The important thing is that two groups of cavities of like size are provided with all hollow cavities of one size being located in the one separation plane and also the hollow cavities of the other size being located in the other separation plane.

Further, a handling system, designated at reference numeral 40, belongs to injection molding machine 10.

Handling system 40 as a whole is adapted to be displaced along a second axis 41. Second axis 41 extends perpendicularly to first axis 23. Preferably, both axes 23 and 41 extend horizontally, however, also other configurations are deemed to be possible, for example such that first axis 23 extends horizontally and second axis 41 extends vertically.

Handling system 40 comprises a movable robot 42 having a direction of displacement along second axis 41. This is indicated in FIG. 1A by a double arrow 43.

Robot 42 comprises a plate 44; extending preferably transversely relative to second axis 41. A first arm 45 as well as a second arm 46 protrude from plate 44 and are directed towards stack mold 12. Second arm 46 preferably comprises a first sub-arm 47 as well as a second sub-arm 48. Sub-arms 47 and 48 are arranged parallel to one another and directly adjacent one to the other. Preferably, they are designed identically, however, pivoted by 180° relative to one another, as will be explained further below.

Also insofar it should be mentioned that the illustration shall only be understood as an example. Arms 45 and 46 must not at all be securely fixed to common plate 44. Instead, it is highly preferred in the context of the present invention when both arms 45 and 46 may be displaced absolutely independently one from the other, in particular by their own displacement drives (not shown). However, they may also be positioned on a common plate and may be individually displaced relative to that plate.

On the left hand side of first arm 45 in FIG. 1A, there are four seats 49a through 49d. Likewise, first sub-arm 47 on the left hand side in FIG. 1A is provided with four seats 50a through 50d and second sub-arm 48 is likewise provided with four seats 51a through 51d on the right hand side. Seats 49a through 49d, 50a through 50d, and 51a through 51d are arranged in the same raster. This raster corresponds to the arrangement of hollow cavities 30a through 30d and 32a through 32d within stack mold 12. As seats 50a through 50d and seats 51a through 51d are located on opposite sides of sub-arms 47 and 48, they may be configured identically relative to one another, however, are arranged at positions rotated by 180° on plate 44.

A double arrow 52 finally indicates that first arm 45 may be displaced in a direction parallel to second axis 41 relative to plate 44. This will be explained in further detail below together with FIG. 6.

Further, handling system 40 comprises a transfer station 56.

In the embodiment shown in FIG. 1A, transfer station 56 is located on the left hand side of first arm 45 next to robot 42. Transfer station 56 is adapted to be moved parallel to first axis 23, i.e. under right angles relative to second axis or axis of displacement 41 of robot 42. This is indicated by a double arrow 57.

Transfer station 56 comprises a transfer plate 58 extending parallel to arms 45 and 46. Transfer plate 58 is provided with seats 59a through 59d on its right hand side in FIG. 1, wherein the raster of these seats 59a through 59d again corresponds to the raster of the other seats 49a through 49d, 50a through 50d, and 51a through 51d.

Finally, injection molding machine comprises a conveyor 64 for carrying away the finished plastic material articles from the area of handling system 40. Conveyor 64 is provided with conveyor paths 65a through 65d having a distance one from the other corresponding to the raster of various seats 49, 50, 51, and 59.

In the top plan view of FIG. 1A, four hollow cavities 30, 32 each and seats 49, 50, 51, and 59 are shown. However, it goes without saying that in front of and behind these elements, still further elements may be located so that a two-dimensional raster of, for example, 4×4=16 such elements is used. However, also this is only to be understood as an example.

Finally, FIG. 1B on a highly enlarged scale shows a cross-sectional view of a plastics material article 70 consisting of a first component 71 and a second component 72. FIG. 1B shows an essentially plane plastic material article 70, however, this is also to be understood just as an example.

Plastic material article 70 may, for example, comprise a first component 71 from a non-transparent plastic material. A print, photograph or the like may be applied to the right hand side of first component 71 in FIG. 1B. Second component 72 may be made from another, transparent plastic material such that the print or photo remains visible. By doing so, plastic material articles 70 with various decorations may be manufactured. However, it goes without saying also here that the illustration in FIG. 1B is only to be understood as an example. Plastic material article 70 may, of course, have any conceivable shape. It is, further, not necessary that components 71 and 72 be of the same size or be equally thick because also highly diverging ratios of size and/or volumes may be used. There is no restriction whatsoever insofar.

The operation of the apparatus shown in FIG. 1A shall now be explained with the help of FIGS. 2 through 8, showing various operational positions. For that purpose, only the elements of interest during a particular operational position are designated with reference numerals.

Figure 2:
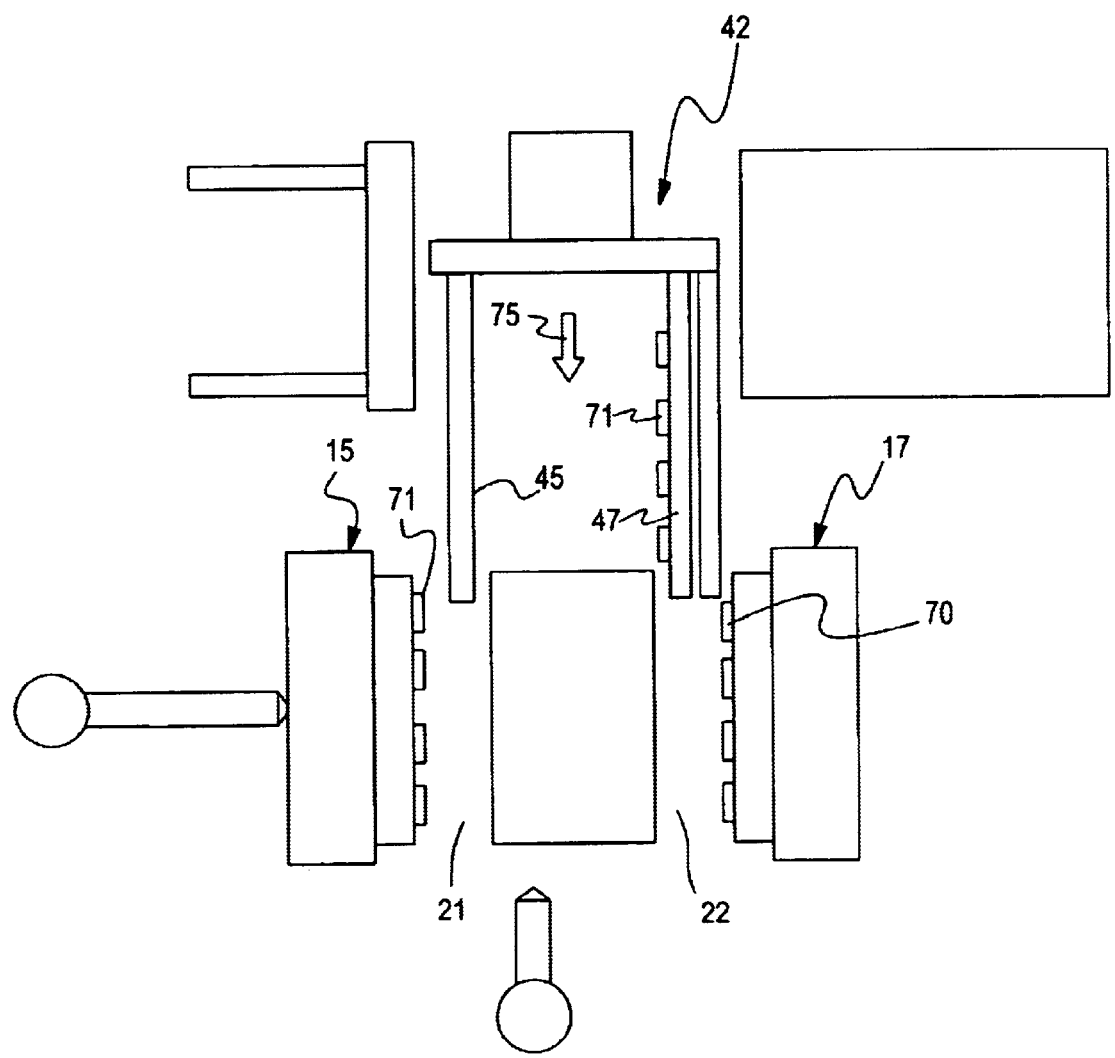
FIG. 2 is a highly schematic depiction of the apparatus of FIG. 1A in a first operational position.

In FIG. 2, displaceable robot 42 has already left its initial position of FIG. 1A in a downward direction as indicated by arrow 75. At this moment in time, first components 71 having been manufactured during preceding phases of the process are located on the surface of first mold portion 15. Other first components 71 are located on the left hand side of first sub-arm 47 by means of seats 50a through 50d. Finally, at that moment in time finished plastic material articles are already located in second mold portion 17.

Figure 3:
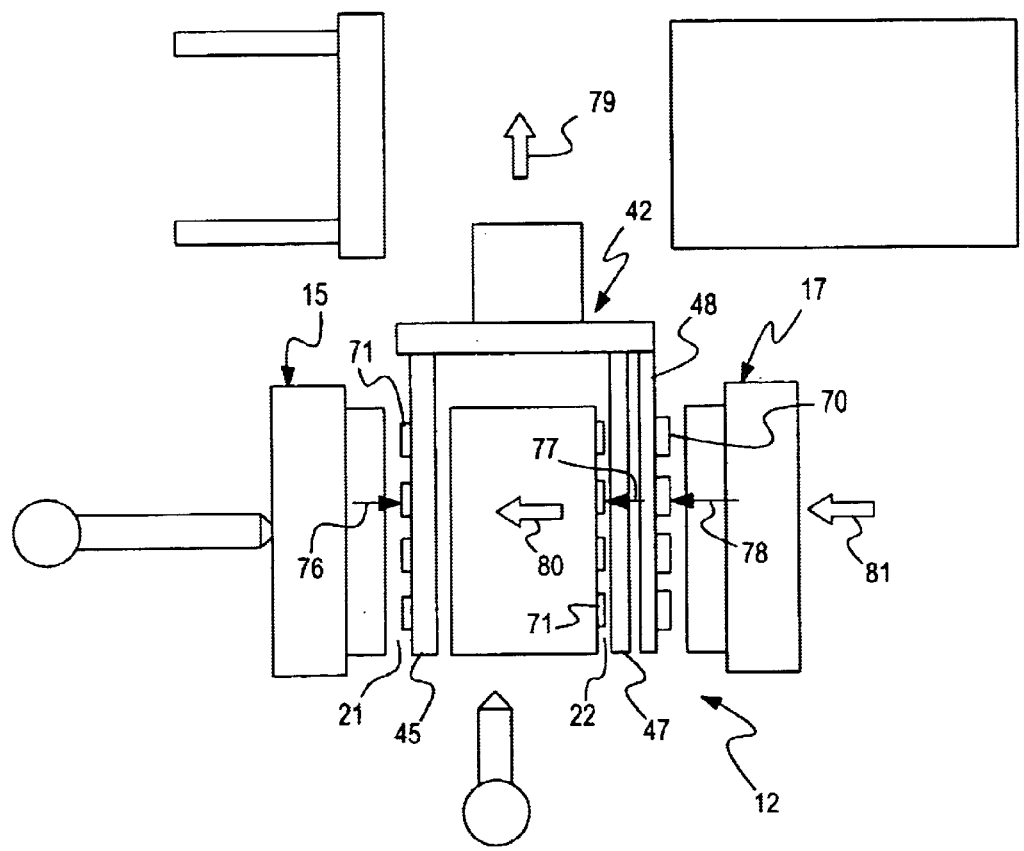
FIG. 3 is an illustration, similar to that of FIG. 2, however, for a second operational position.

In the subsequent method step according to FIG. 3, first components 71 are now transferred from first mold portion 15 to the left surface of first arm 45 or to seats 49a through 49d thereof, respectively, as indicated by an arrow 76. Simultaneously, the transfer of first components 71 takes place, which are taken away from first sub-arm 47 and transferred into the left halves of second hollow cavities. 32a through 32d within center platen 13. This is indicated by an arrow 77 in FIG. 3.

Further simultaneously, finished plastic material articles 70 are unmolded from second mold portion 17. Plastic material articles 70 are transferred from the right surface of second sub-arm 48 or seats 51a through 51d thereof. This is indicated by an arrow 78 in FIG. 3.

As soon as these transfers (arrows 76, 77 and 78) have been completed, robot 42 again moves upwardly, as indicated by an arrow 79. As soon as arms 45, 47 and 48 have moved away from gaps 21 and 22, stack mold 12 is closed as indicated with arrows 80 and 81.

Figure 4:
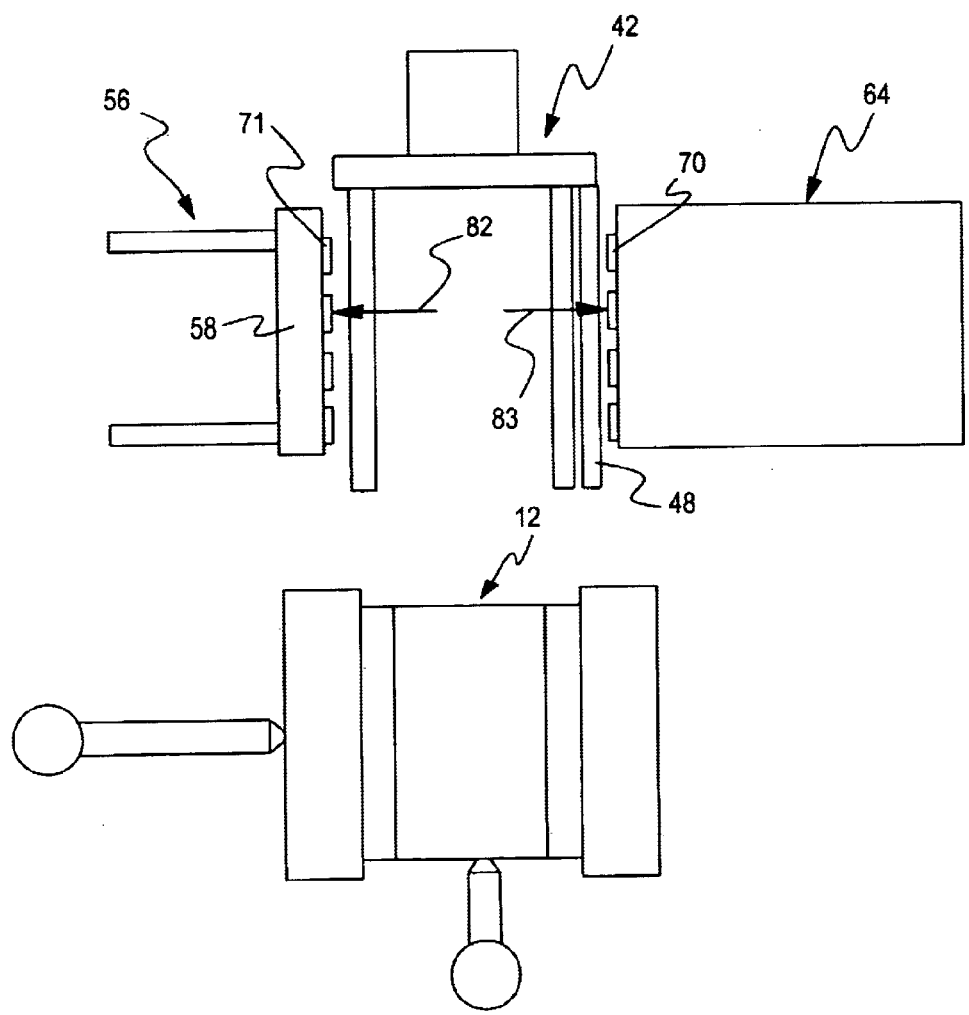
FIG. 4 is an illustration, similar to that of FIG. 2, however, for a third operational position.

FIG. 4 shows the situation where stack mold 12 is now closed. Robot 42 is located in its uppermost terminal position corresponding to the initial position of FIG. 1A.

An arrow 82 indicates that first components 71 are now transferred from transfer plate 58 to transfer station 56. Simultaneously, finished plastic material articles 70 are transferred from second sub-arm 48 onto conveyor 64, as indicated by an arrow 83.

Figure 5:
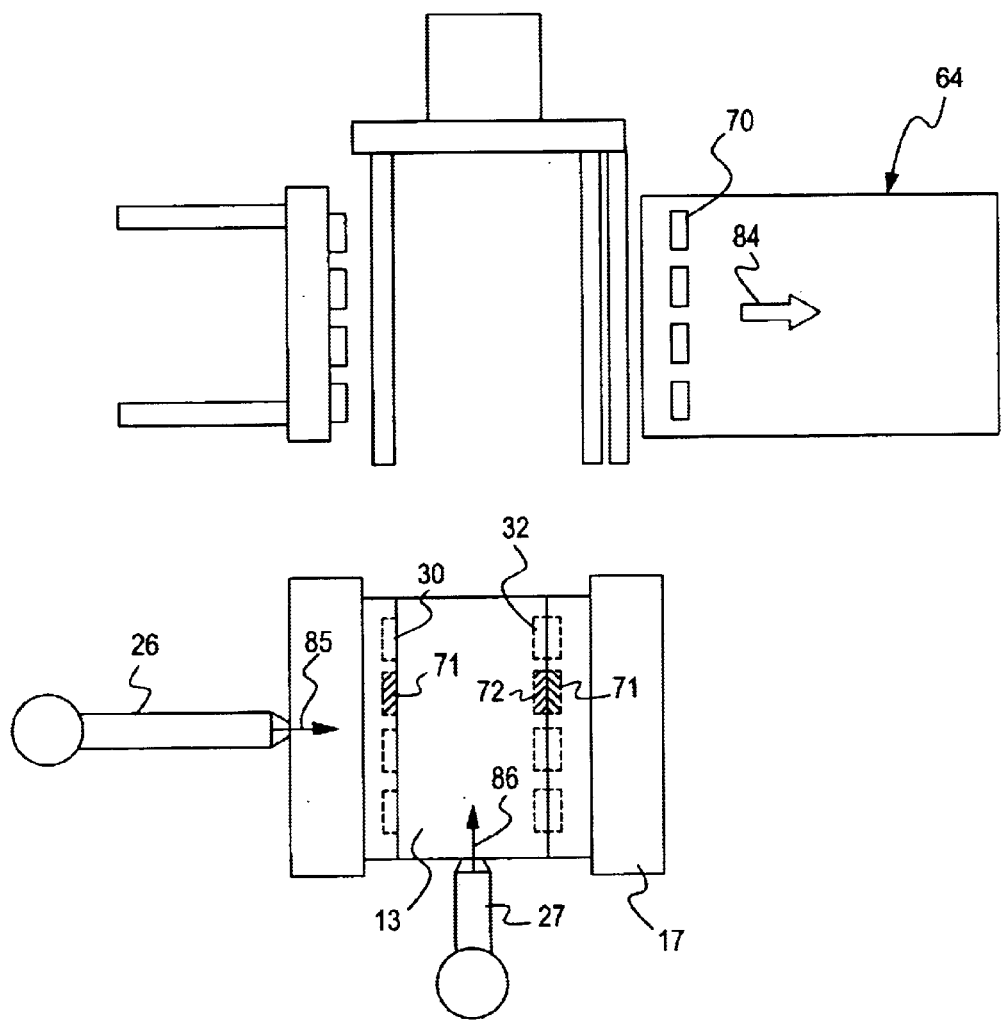
FIG. 5 is an illustration, similar to that of FIG. 2, however, for a fourth operational position.

FIG. 5 shows that plastic material articles 70 are now carried away on conveyor 64, as indicated by an arrow 84.

While all this happens, the next "shot" of injection molding machine 10 takes place.

For that purpose, a predetermined amount of liquid plastic material is ejected from first injection molding assembly 26 to first mold portion 15, as indicated by an arrow 85. At the same moment in time, a connection is made between second injection molding assembly 27 and center platen 13, and a shot indicated by an arrow 86 is fired from second injection molding assembly 27.

By doing so, first components 71 are generated within first hollow cavities 30 by means of first injection molding assembly 26.

On the other hand side, injecting plastic material from second injection molding assembly 27 into center platen 13 has the effect that the first components 71 located in the left hollow cavity half of second hollow cavity 32 (cf. FIG. 3) are transferred into the right hollow cavity half, while the second components 72 are injection-molded on the first components 71 in the remaining free space.

Figure 6:
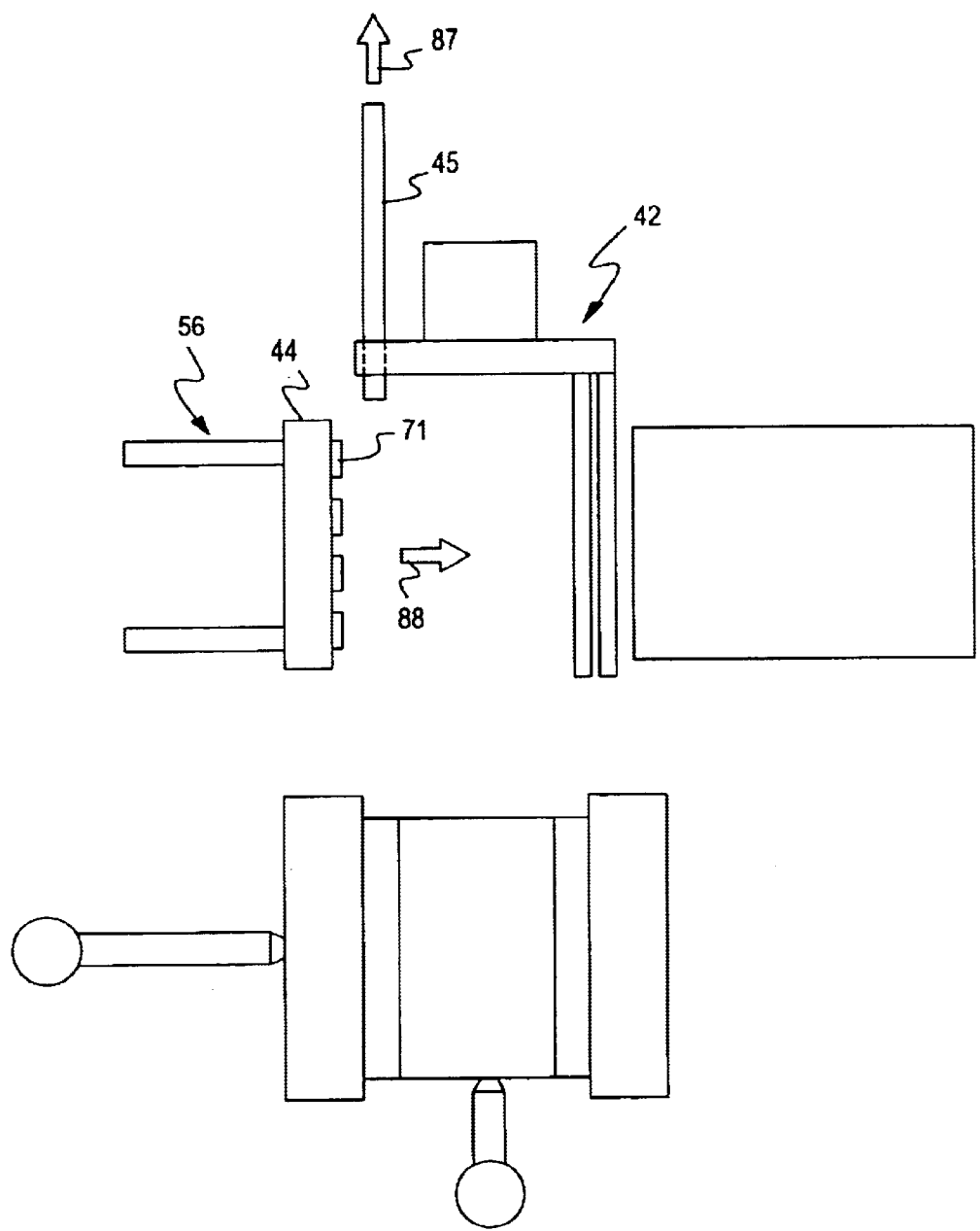
FIG. 6 is an illustration, similar to that of FIG. 2, however, for a fifth operational position.

FIG. 6 illustrates the action of transfer station 56. In order to allow movement of the latter, first arm 45 must first be moved away from the trajectory of transfer station 56. This is preferably made along a linear, upwardly directed movement as shown by an arrow 87. After the way for transfer station 56 to the right hand side is now free, it may be advanced as shown with an arrow 88. The first components 71 located on plate 44 are thereby taken along towards the right hand side.

Figure 7:
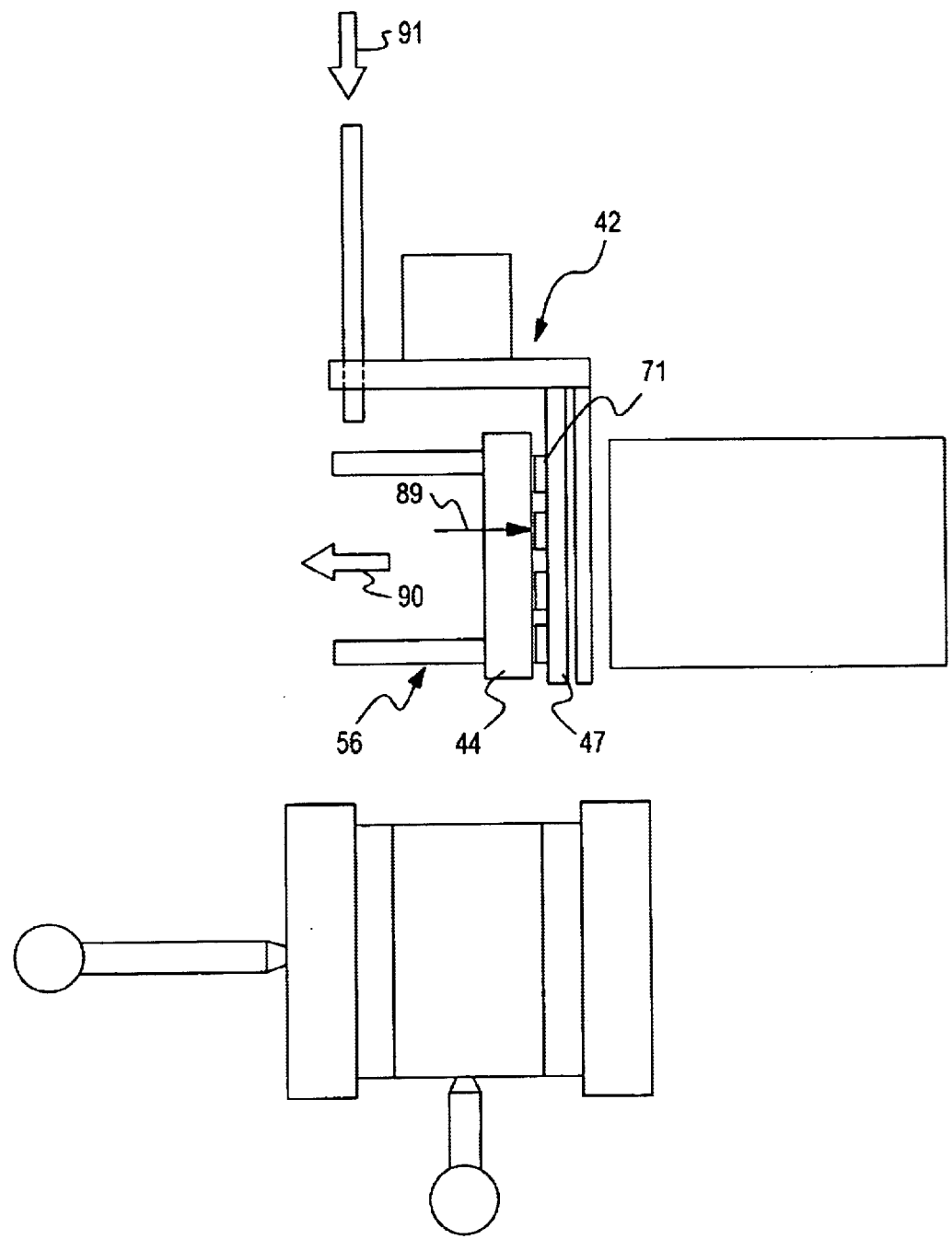
FIG. 7 is an illustration, similar to that of FIG. 2, however, for a sixth operational position.

As soon as plate 44 has reached its right hand terminal position as shown in FIG. 7, the first components 71 may be transferred to first sub-arm 47, as indicated by an arrow 89. Transfer station 56 may now be moved back again into its initial position according to FIGS. 1 through 6 in the direction of arrow 90.

Figure 8:
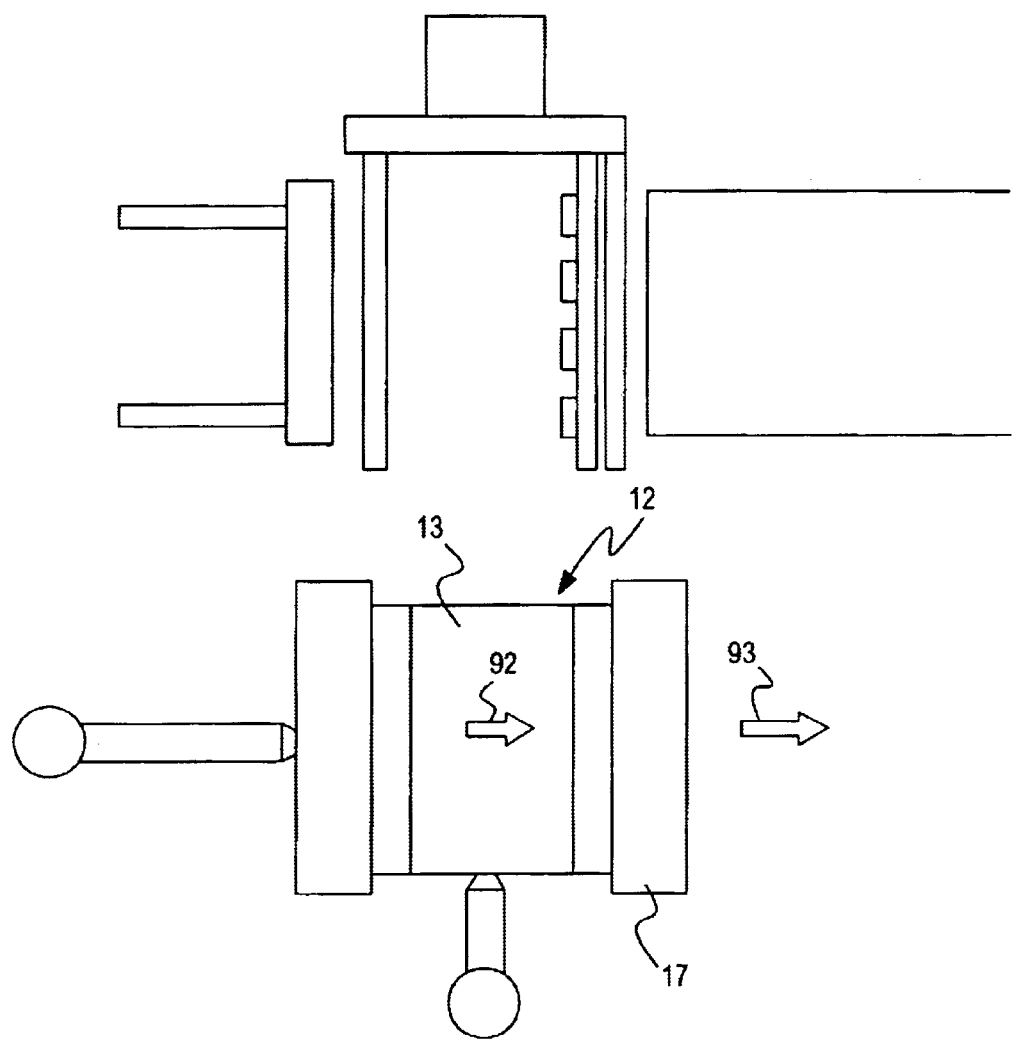
FIG. 8 is an illustration, similar to that of FIG. 2, however, for a seventh operational position.

As shown in FIG. 8, stack mold 12 may now be opened, as shown with arrows 92 and 93 for center platen 13 and second mold portion 17. As soon as stack mold 12 has been entirely opened, injection molding machine 10 has again assumed its initial position of FIG. 1.

With respect to the afore description of the various process steps, it goes without saying that the phases or steps shown in FIGS. 2 through 8 must not necessarily be executed subsequently. Instead, it would be desirable to achieve the largest possible overlap in time up to a parallel execution of the steps, so that the entire cycle time can be made as short as possible. Therefore, if in the course of the preceding description individual process steps or phases have been explained one after the other, this does not mean at all that these phases must also be executed subsequently in reality.

Further, it goes without saying that the transfer steps and process steps explained above in detail should only be understood as an example. As an alternative, also other process steps or transfer steps may be used, as long as they operate according to the same principle.

However, it is important that the hollow cavities (30a through 30d) of the same volume are always located within the same separation plane (I), whereas the hollow cavities (32a through 32d) of the other volume are all located in the other separation plane (II)) By doing so, variable temperature assemblies 28 and 29 may be optimized with respect to the particularly given hollow cavity size.

Moreover, it is important that during the movement of robot 42, i.e. during advancing arms 45 and 46 into gaps 21 and 22, this is made essentially in synchronism, i.e. that all arms enter into gaps 21 and 22 essentially simultaneously. In the shown embodiment, this may be effected in a very simple manner by moving arms 45 and 46 on the same plate 44 and advancing same together. As an alternative, arms 45 and 46 or sub-arms 47 and 48 may be provided with individual drive systems by means of which they may enter into gaps 21 and 22. In that situation, it would only be necessary to guarantee a certain synchronism of the drive systems.

It has already been mentioned above that the invention may advantageously be used also with other types of molds. Among these would be stack molds having more than one center platen and two lateral mold portions, i.e. for example five or more such elements. In such a complicated stack mold, it will be possible to manufacture plastic material articles consisting of three, four or even more layers. On the other hand side, the invention may advantageously be used in connection with very simple molds, i.e. molds consisting conventionally of two mold portions only. Within the scope of the knowledge of the skilled artisan, the above-described sequence of movements may be adjusted in such situations which also applies for the required handling systems.

Figure 9:
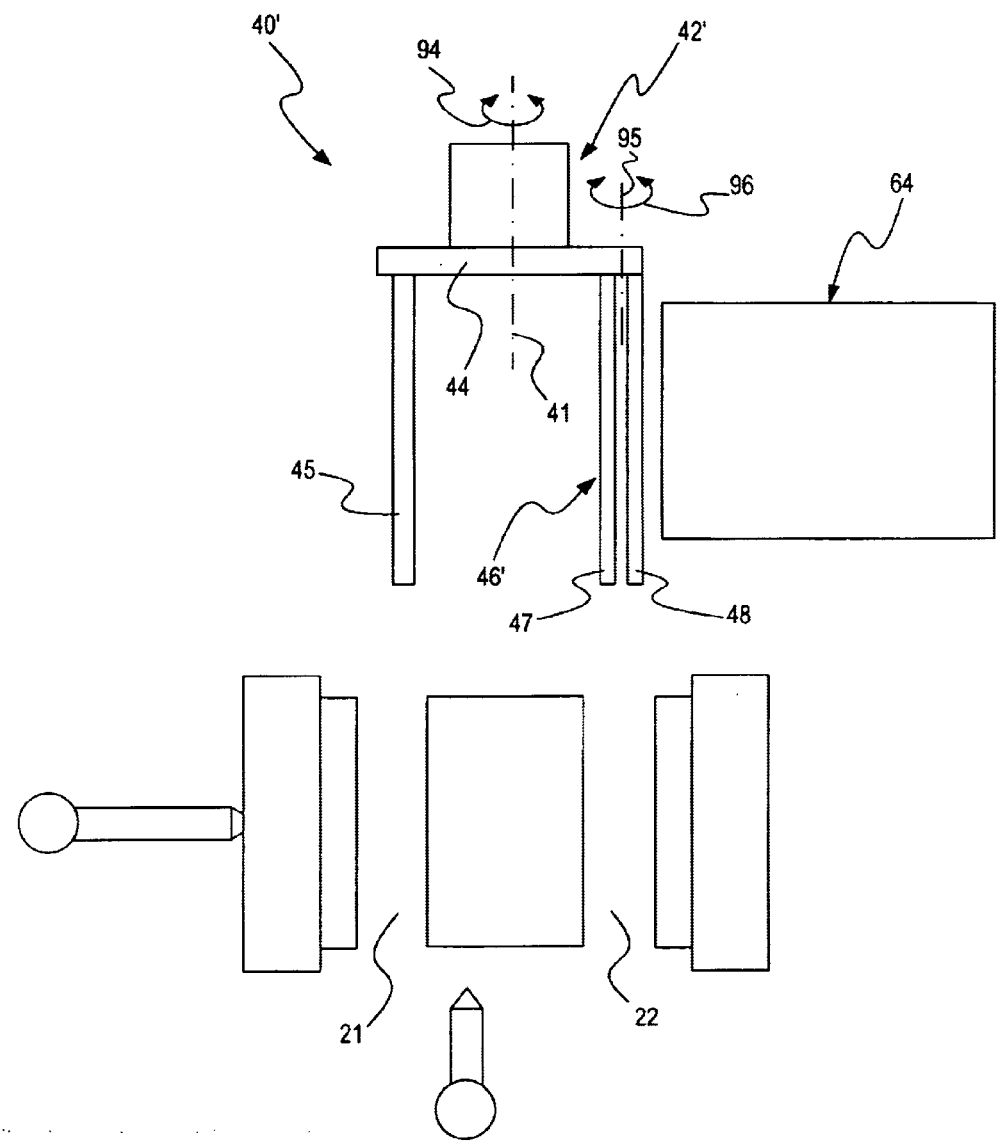
FIG. 9 is an illustration, similar to that of FIG. 2, however, for another embodiment of an inventive apparatus.

A first example of a conceivable variation is shown in FIG. 9. The elements are designated with the same reference numerals, however, where ever modifications are provided as compared to the embodiment of FIGS. 1 through 8, an apostrophe is added.

In the arrangement of FIG. 9, a handling system 40' is utilized which does not require a transfer station.

Instead, robot 42' is, further, adapted to be rotated about second axis 41, as indicated by a double arrow 94. By rotating robot 42', first arm 45 is flush with gap 21 and second arm 46' is flush with second gap 22 in one of the end position of rotation, corresponding to the same conditions as described above.

In the other end position of rotation, being not shown in FIG. 9, the relationship is just inverted because now first arm 45 is flush with second gap 22 and second arm 46' is flush with first gap 21.

Moreover, second arm 46' as a whole is adapted to be rotated about a third axis 95 extending parallel to second axis 41. This is indicated by a double arrow 96 in FIG. 9.

By doing so, it is possible to interchange the positions of sub-arms 47 and 48. By doing so, the position of conveyor 64 or its design, respectively, may remain unchanged.

The various phases of transfer and displacement of components 71, 72 and plastic material article 70, respectively, will be apparent for the skilled artisan as corresponding modifications of what was described above with respect to FIGS. 2 and 8.

Figure 10:
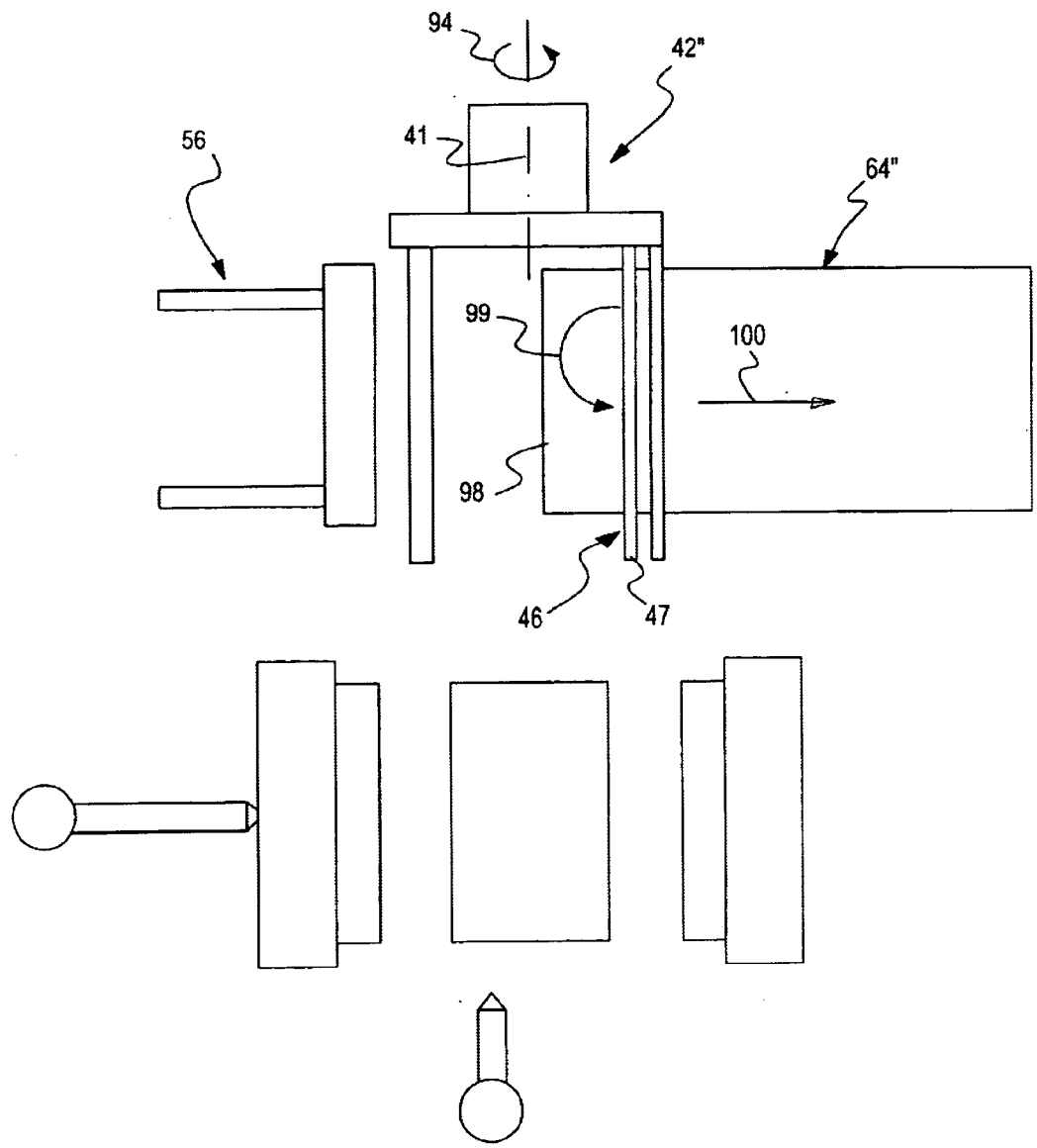
FIG. 10 is an illustration, similar to that of FIG. 2, however, for still another embodiment of an inventive apparatus.

The same holds true for a second variation according to FIG. 10. In this second variation, like elements are again designated with like reference numerals with any changes made being indicated by a double apostrophe.

The variation of FIG. 10 distinguishes from the variation of FIGS. 1 through 8 in that robot 42" again is made to be rotatable about second axis 41, as again indicated by double arrow 94. Second arm 46, in contrast, is non-rotatable. On the other hand side, this embodiment again is provided with a transfer station 56.

Considering the necessary sequence of steps for that embodiment, the finished plastic material articles are now located on the left hand half of first sub-arm 47, when they shall be transferred to conveyor 64". Therefore, the latter is provided with an extension configurated by a section 98 extending to the left hand side until below first sub-arm 47. Plastic material articles 70 are now transferred to conveyor 64' from the left side of first sub-arm 47 and are then conveyed below second arm 46 as indicated by arrows 99 and 100.

Figure 11:
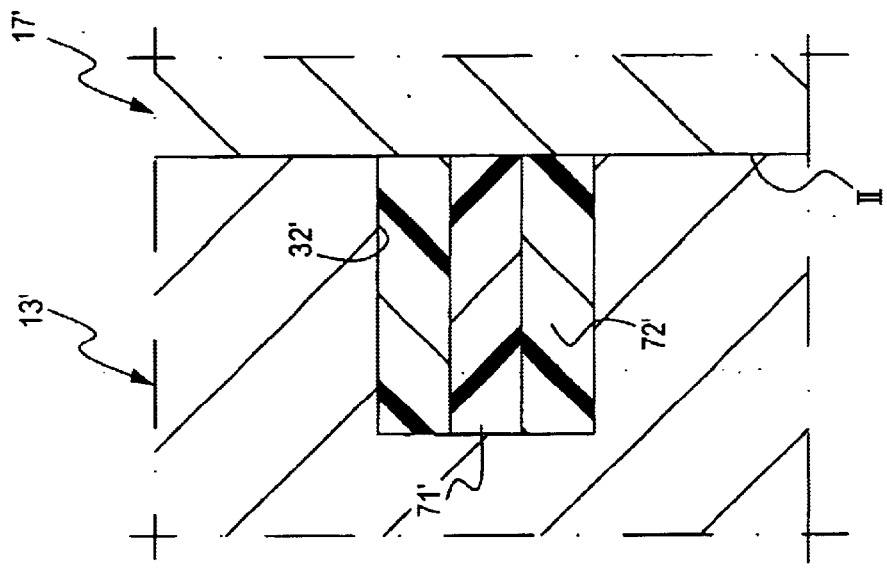
FIG. 11 is an illustration, similar to that of FIGS. 1A and 1B, however, for still another plastic material article in which a second component encloses a first component like a cylindrical jacket or sleeve.
Figure 11:
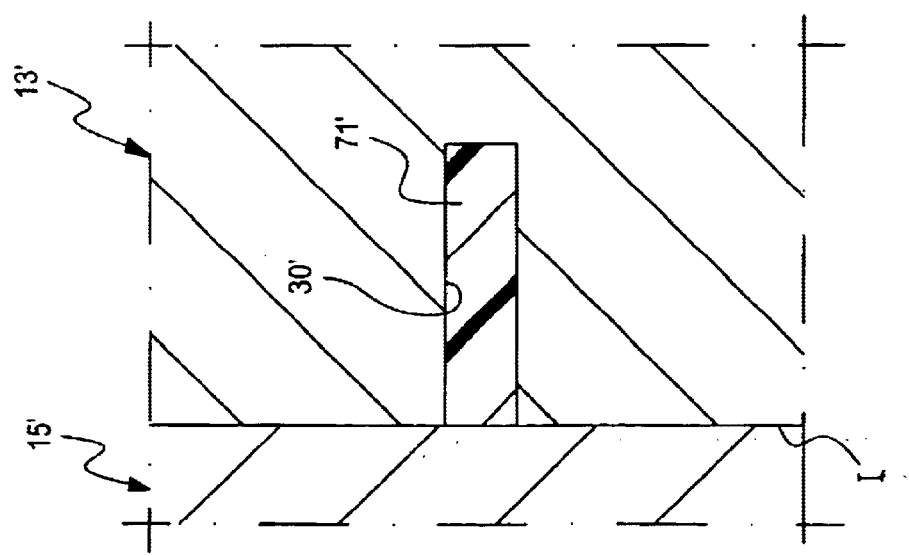

FIG. 11, similar to the illustration of FIGS. 1A and 1B, shows another embodiment of the invention. In the left hand side of FIG. 11, one can see a center platen 13' having a first hollow cavity 30', having, for example, a circular-cylindrical shape.

A first component 71' has already been injected into first hollow cavity 30'.

In the right hand halt of FIG. 11, one can see a second hollow cavity 32', into which first component 71' has been placed, for example in an axial direction, such that a free space remains around first component 71'. First component 71' is held at its lateral front sides (not shown) within second hollow cavity 32'.

In FIG. 11, second hollow cavity 32' is already repleted with injected second component 72' Which, therefore, encloses first component 71' like a cylindrical jacket or sleeve. First component 71, therefore, configurates a "core" around which one (72') or more layers may be injected. These layers may, for example, consist of different plastic materials, wherein, for example, the inner plastic material ray be hard and the outer plastic material may be soft. The various plastic materials used may also have different colors.

Figure 12:
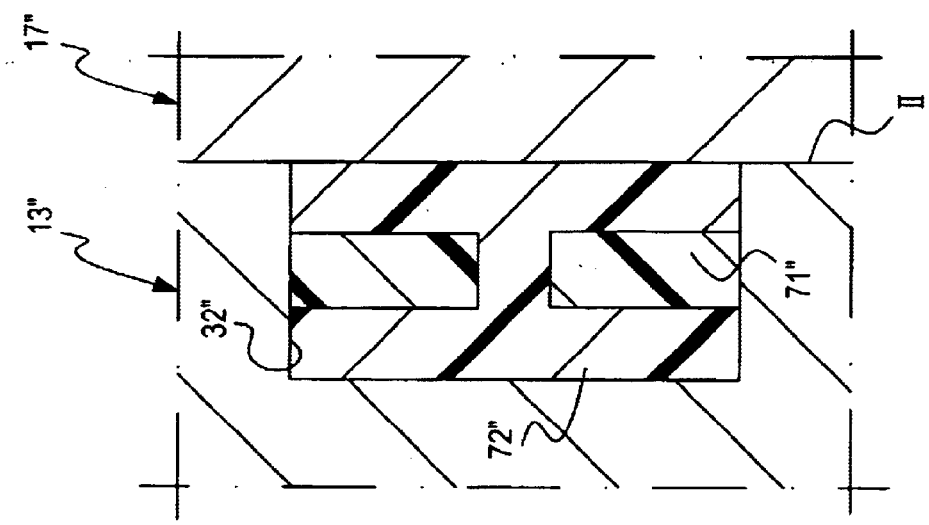
FIG. 12 is an illustration, similar to that of FIG. 11, however, for still another plastic material article in which a second component goes through a first component.
Figure 12:
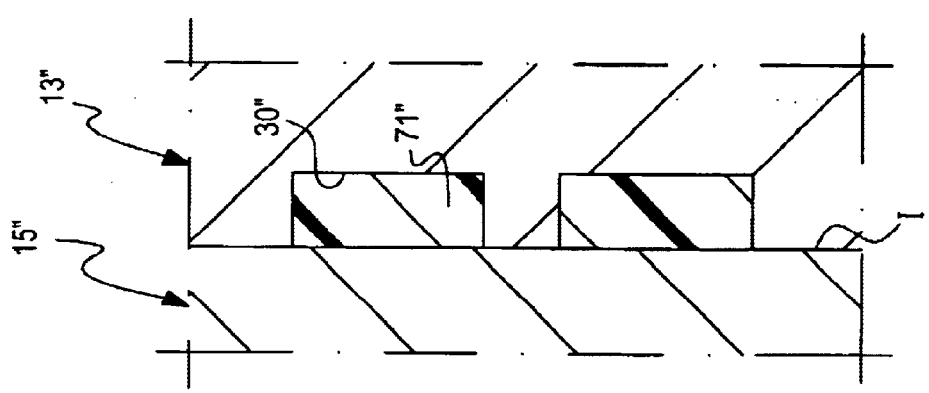

FIG. 12 shows a variation of the embodiment shown in FIG. 11. In FIG. 12 (left hand side), a preform is first manufactured as an annular first component 71" within first hollow cavity 32". After transfer (right hand side) into second hollow cavity 32", first component 71" is fixed within second hollow cavity 32", in the shown center position, so that it is now accessible from both sides. The second hollow. cavity 32" is now repleted by injection-molding, whereby the second component 72' so generated goes through first components 71".

In the before-described manner, highly complex and also thick-walled or compact-integral plastic material articles may be manufactured. Preferably, components made from different plastic materials are used having, for example different strength and/or color.

Although the invention, as already mentioned, is not limited to the manufacture of multi-component plastic material articles, it should be mentioned at the end of this description that such multi-component articles gain increasingly importance both, under technical and under economical aspects. In such articles, two components are connected such that the plastic material article being best suited for a specific purpose is located at a position where it is most required on an injection-molded article in its practical use and, hence, has the best reliability. Insofar, this technology is highly attractive for injection-molding of top quality.

In the course of such considerations, one must also put the question of connecting thermoplastic with elastomeric materials of all kinds and also of duroplastic materials. The connection thus achieved is of high importance and is, inter alia, influenced by the described method and the parameters acting in connection therewith. The cooling time of the first component being a necessary waiting time until the second component may be injected thereon, may be of importance for the connection. In particular, the injection processes within the two hollow cavities have an influence on each other. Therefore, it can be advantageous for the proper function of the articles, for an optimum time cycle sequence and in view of economic considerations, to have a technical solution at hand, allowing an optimum separation of functions.

This becomes particularly clear if it is intended to interconnect duroplastic material and/or rubber with thermoplastic materials in one plastic material article. The hardening temperature in such situation requires a thermal separation of the thermoplastic and the duroplastic or rubber component from each other. This is a problem that has not been reliably solved up to today. For example, it is impossible according to the state of the art to let the hardening temperature of the duroplastic material or of a rubber act on a thermoplastic material. A hot hollow cavity is improper for thermoplastic materials.

In contrast to that, the invention has a number of advantages in that highly distinct plastic materials may be selected in different areas of the mold at temperatures being optimal for their ability to be connected to one another. This results in a better quality of the articles and a shortening of cycle times.

What is claimed is:

1. An apparatus for injection-molding plastic material articles having at least first and second components, the apparatus having open and closed configurations and the apparatus comprising:

a center platen having a first and an opposite second side;

a first mold portion cooperating with the first side of the center platen thereby defining a first separation plane;

a second mold portion cooperating with the second side of the center platen thereby defining a second separation plane wherein the open configuration is defined by the center platen and the first and second mold portions being distanced from each other along a separation axis thereby defining gaps therebetween and wherein the closed configuration is defined by the center platen and the first and second mold portions being positioned adjacent each other;

a plurality of first, cavities positioned adjacent the first separation plane;

a plurality of second, larger cavities positioned adjacent the second separation plane;

a first temperature control element positioned adjacent the first separation plane and regulating at a first temperature;

a second temperature control element positioned adjacent the second separation plane and regulating at a second temperature;

a first injector assembly providing plastic material to the first cavities so as to form the first components;

a second injector assembly providing plastic material to the second cavities so as to form the second components on the first components thereby forming the plastic material articles; and a handling system, the handling system removing the first components from the first cavities, transferring the first components to the second separation plane, placing the first components in the second cavities, and unmolding the plastic material articles from the second cavities.

2. The apparatus of claim 1, wherein the handling system comprises a robot having arms wherein the arms are extensible along an extension axis into the gaps between the center platen and the first and the second mold portions when the apparatus is in the open configuration wherein the arms extend substantially along the extension axis and wherein the extension axis is substantially perpendicular to the separation axis.

3. The apparatus of claim 2, wherein the arms comprise a first arm extensible into the first separation plane wherein the first arm is provided with seats for the first components and a second arm having two sides extensible into the second separation plane wherein the second arm is provided with seats on the two sides for the plastic material articles wherein one of the sides of the second arm faces the first arm and the other side of the second arm is opposite the first arm.

4. The apparatus of claim 3, wherein the second arm comprises two sub-arms each having opposing sides wherein the seats of the second arm are positioned on the opposing sides of the two sub-arms.

5. The apparatus of claim 3, further comprising a transfer station having a rest position wherein the transfer station transfers the first components from the seats of the first arm to the seats of the second arm.

6. The apparatus of claim 5, wherein the transfer station is displaceable along a transfer axis the transfer axis being substantially perpendicular to the extension axis.

7. The apparatus of claim 6, wherein the transfer station in the rest position is located adjacent the first arm so as to transfer the first components from the first arm to the transfer station.

8. The apparatus of claim 7, wherein, following the transfer of the first components from the first arm to the transfer station, the first arm is displaced away from the transfer axis and the transfer station is displaced so as to be adjacent the second arm.

9. The apparatus of claim 3, wherein the robot is rotatable about the extension axis such that, following rotation of the robot, the first arm is adjacent the second separation plane and the second arm is adjacent the first separation plane.

10. The apparatus of claim 9, wherein the second arm is rotatable about the extension axis.

11. The apparatus of claim 3, further comprising a conveyor, the conveyor removing the plastic material articles from adjacent the second arm.

12. The apparatus of claim 11, wherein the plastic material articles are transferred to the conveyor from the side of the second arm opposite the first arm.

13. The apparatus of claim 11, wherein the plastic material articles are transferred to the conveyor from the side of the second arm facing the first arm.

14. An apparatus for injection-molding plastic material articles having at least first and second components, the apparatus comprising:

a center platen having a first and an opposite second side;

a first mold portion cooperating with the first side of the center platen thereby defining a first separation plane;

a second mold portion cooperating with the second side of the center platen thereby defining a second separation plane;

a plurality of first, cavities positioned adjacent the first separation plane;

a plurality of second, larger cavities positioned adjacent the second separation plane;

a first injector assembly providing plastic material to the first cavities so as to form the first components;

a second injector assembly providing plastic material to the second cavities so as to form the second components on the first components thereby forming the plastic material articles; and a handling system comprising at least two arms independently extendable into the first and second separation planes, the handling system removing the first components from the first cavities, transferring the first components to the second separation plane, placing the first components in the second cavities, and unmolding the plastic material articles from the second cavities.

15. The apparatus of claim 14, further comprising:

a first temperature control element positioned adjacent the first separation plane and regulating at a first temperature; and a second temperature control element positioned adjacent the second separation plane and regulating at a second temperature.

16. An injection molding machine for injection molding plastic material articles comprising at least a first and a second mold portion wherein the first and the second mold portions cooperate thereby defining a separation plane and further comprising a temperature controller for temperature regulating different areas of the separation plane at different temperatures.

17. The injection molding machine of claim 16, further comprising a center platen having a first and a second side the center platen being arranged in a stack mold configuration with the at least first and second mold portions such that the first side of the center platen cooperates with the first mold portion thereby defining a first separation plane and the second side of the center platen cooperates with the second mold portion thereby defining a second separation plane and said temperature controller adapted to temperature regulate the first and the second separation planes at different temperatures.

18. The injection molding machine of claim 17, wherein the injection molding machine is provided with a plurality of first, smaller cavities adjacent the first separation plane and a plurality of second, larger cavities adjacent the second separation plane.

* * * * *

UNITED STATES PATENT AND TRADEMARK OFFICE
CERTIFICATE OF CORRECTION

PATENT NO. : 6,827,571 B2
DATED : December 7, 2004
INVENTOR(S) : Richard Herbst

It is certified that error appears in the above-identified patent and that said Letters Patent is hereby corrected as shown below:

<u>Title page,</u>
Item [57], ABSTRACT,
Line 12, after "A device" delete "are" and insert -- is --.

Signed and Sealed this

Seventh Day of February, 2006

JON W. DUDAS
*Director of the United States Patent and Trademark Office*